United States Patent
Combs, Jr.

(10) Patent No.: US 8,299,901 B2
(45) Date of Patent: Oct. 30, 2012

(54) CONTROL LOCKOUT FOR AN ELECTRONIC APPARATUS

(75) Inventor: Robert E. Combs, Jr., Macomb, MI (US)

(73) Assignee: Panasonic Automotive Systems Company of America, Peachtree City, GA (US)

( * ) Notice: Subject to any disclaimer, the term of this patent is extended or adjusted under 35 U.S.C. 154(b) by 1151 days.

(21) Appl. No.: 12/012,853

(22) Filed: Feb. 6, 2008

(65) Prior Publication Data
US 2009/0195404 A1 Aug. 6, 2009

(51) Int. Cl.
*G05B 11/01* (2006.01)
(52) U.S. Cl. ............... 340/12.22; 340/12.29; 340/12.5; 340/4.3; 340/4.37; 340/5.1; 348/843; 725/25; 345/169
(58) Field of Classification Search ........... 340/825.22–825.24, 5.1, 3.1, 426.13–426.17, 12.22; 348/843; 725/25, 26; 341/173–176; 345/169
See application file for complete search history.

(56) References Cited

U.S. PATENT DOCUMENTS

| | | | | |
|---|---|---|---|---|
| 4,965,557 | A * | 10/1990 | Schepers et al. | 345/169 |
| 5,046,125 | A * | 9/1991 | Takizawa | 455/411 |
| 5,065,155 | A * | 11/1991 | Oogita et al. | 340/5.51 |
| 5,120,236 | A * | 6/1992 | Gilbert | 439/133 |
| 5,471,253 | A * | 11/1995 | Nguyen | 348/734 |
| 5,550,575 | A * | 8/1996 | West et al. | 725/28 |
| 5,806,970 | A * | 9/1998 | Giorgianni et al. | 362/253 |
| 5,850,753 | A * | 12/1998 | Varma | 70/278.7 |
| 5,886,730 | A * | 3/1999 | Tsosie | 725/25 |
| 5,949,471 | A * | 9/1999 | Yuen et al. | 725/27 |
| 6,208,379 | B1 * | 3/2001 | Oya et al. | 348/211.11 |
| 6,426,705 | B1 * | 7/2002 | Wischoeffer | 340/12.27 |
| 7,623,022 | B2 * | 11/2009 | Tofts et al. | 340/5.74 |
| 2003/0145322 | A1 * | 7/2003 | Song | 725/26 |
| 2004/0198313 | A1 * | 10/2004 | Chiu | 455/404.1 |
| 2008/0169902 | A1 * | 7/2008 | Shiroyama | 340/5.83 |
| 2009/0023389 | A1 * | 1/2009 | Paryani | 455/41.2 |

* cited by examiner

*Primary Examiner* — Albert Wong
*Assistant Examiner* — Ryan Sherwin
(74) *Attorney, Agent, or Firm* — Laurence S. Roach

(57) ABSTRACT

An electronic system including a user interface for transmitting an operational parameter control signal in response to manual manipulation of the user interface. A processor is coupled to the user interface and adjusts an operational parameter of the electronic system in response to receiving the operational parameter control signal. An actuatable device is actuated by a user. In response to the user actuation, the actuatable device prevents the processor from adjusting the operational parameter of the electronic system.

9 Claims, 3 Drawing Sheets

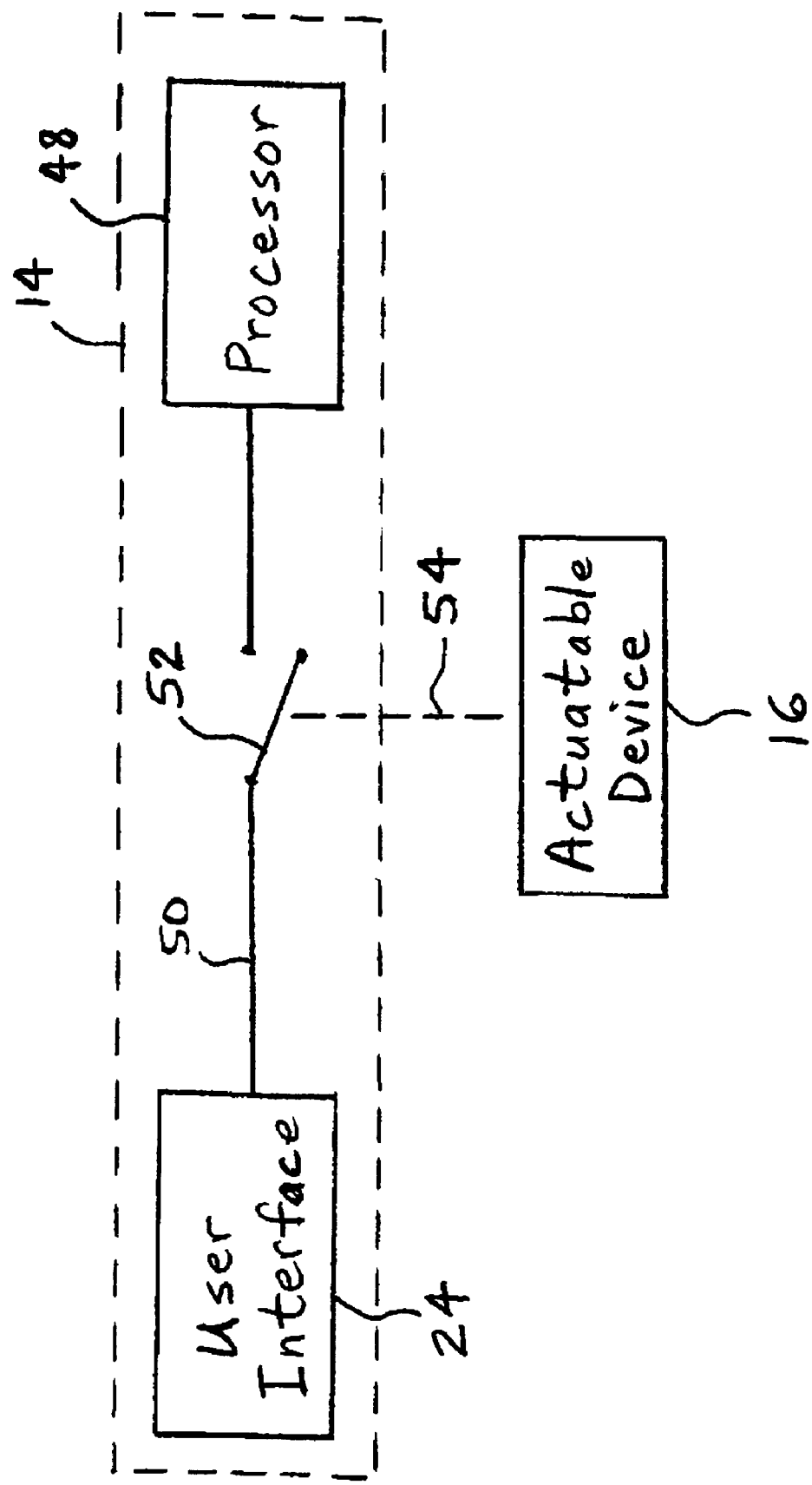

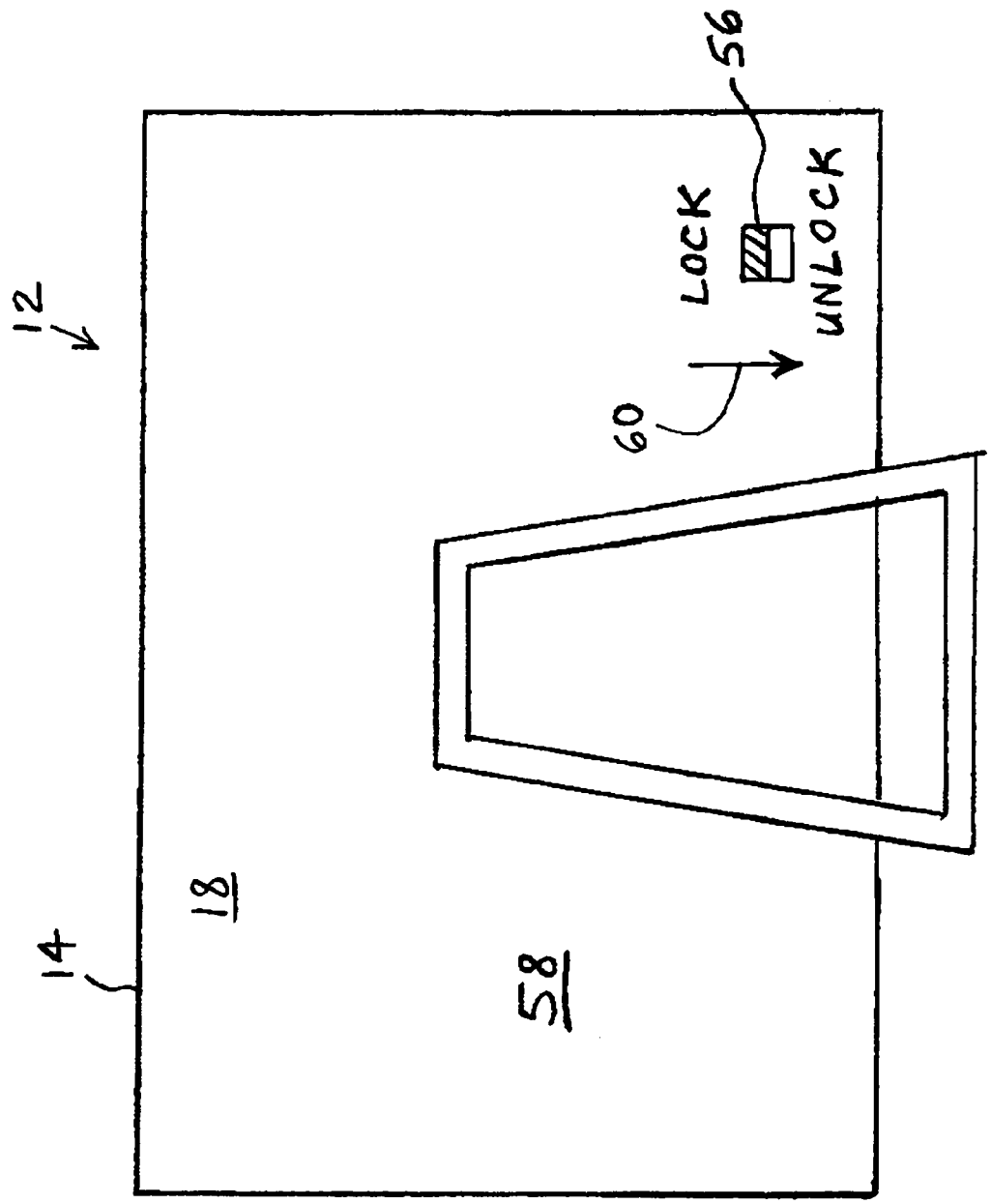

CONTROL LOCKOUT FOR AN ELECTRONIC APPARATUS

BACKGROUND OF THE INVENTION

1. Field of the Invention

The present invention relates generally to control interfaces for electronic devices.

2. Description of the Related Art

Electronic devices typically have control interfaces that a user may use to control the operation of the electronic device. Consumer electronic devices such as televisions, audio systems, electronic game systems, and automobile infotainment systems, for example, typically include a control interface having a variety of pushbuttons and dials by which the user can control the device. That is, the user may use the control interface to turn the device ON and OFF, adjust the audio volume, adjust the video qualities, and/or changes the frequency or channel to which the device is tuned, for example.

The control interface is often provided on a very accessible location on the surface of the device, such as on the device's front face. This placement of the user interface may be for the convenience of the user as it may allow the user to use the control interface to make adjustments without the user having to divert his attention for the display portion of the device.

One difficulty associated with the above-described easily accessible placement of the user interface is that small children may also have easy access to the user interface. Small children may be attracted to the buttons and dials and may play with them, thereby changing the settings that the user previously made and currently desires. In a crowed environment, it is also possible for the interface controls to be inadvertently bumped by pets or by adults, which can also result in an undesired change in the settings of the electronic device.

In other settings, inadvertent actuation of the user interface may be unlikely, but the desired operation of the electronic device may be so important or valuable that inadvertent changing of the device's settings is a risk that cannot be taken. This may be the case in medical or industrial settings, for example.

What is needed in the art is a user interface of an electronic device that cannot be inadvertently actuated to change the device's settings.

SUMMARY OF THE INVENTION

The present invention is directed to an electronic device having a user interface that can be locked by the user such that the user interface cannot be used by others, or inadvertently jostled, to change the settings of the electronic device.

The invention may provide a system of enabling and disabling the user controls of an electronic apparatus. A remote control may have a lockout/parental mode which, when entered, caused the target electronic apparatus to ignore the user controls located on that apparatus. To enable or disable the parental control mode, a button on the remote control may be pressed. In case the remote control is not available or functioning, a specific key combination on the electronic device can be supported to toggle the control lockout.

In a specific embodiment, the invention may limit the functions of changing the channel and volume of a television to the remote control rather than allowing the television's front panel to be used for this purpose. Thus, a child or unauthorized person may be prevented from controlling the function of the electronic apparatus, e.g., power, channel, or next track, or from modifying the apparatus' configuration, such as contrast, sharpness, tint, record, time or date setting.

The invention comprises, in one embodiment thereof, an electronic system including a user interface for transmitting an operational parameter control signal in response to manual manipulation of the user interface. A processor is coupled to the user interface and adjusts an operational parameter of the electronic system in response to receiving the operational parameter control signal. An actuatable device is actuated by a user. In response to the user actuation, the actuatable device prevents the processor from adjusting the operational parameter of the electronic system.

The invention comprises, in another embodiment thereof, an electronic system including an electronic apparatus having a user interface for transmitting an operational parameter control signal in response to manual manipulation of the user interface. A processor is coupled to the user interface and adjusts an operational parameter of the electronic apparatus in response to receiving the operational parameter control signal. A remote controller includes a user-actuatable pushbutton. The remote controller, in response to a first actuation of the pushbutton, transmits a first air-borne signal to the electronic apparatus to inhibit the processor from adjusting the operational parameter of the electronic apparatus. In response to a second actuation of the pushbutton after the first actuation, the remote controller transmits a second air-borne signal to the electronic apparatus to enable the processor to adjust the operational parameter of the electronic apparatus in response to receiving the operational parameter control signal.

The invention comprises, in yet another embodiment thereof, an electronic system including a body having a front surface and a back surface. The back surface is disposed opposite from the front surface. A user interface is disposed on the front surface of the body. The user interface transmits a control signal in response to manual manipulation of the user interface. A processor is coupled to the user interface and adjusts an operational parameter of the electronic system in response to receiving the control signal. An actuatable device is disposed on the back surface of the body. The actuatable device is actuated by a user and, in response to the user actuation, prevents the processor from adjusting the operational parameter of the electronic system.

An advantage of the present invention is that the settings of the electronic device cannot be inadvertently changed.

Another advantage is that the settings of the electronic device cannot be changed by a child or an unauthorized person.

BRIEF DESCRIPTION OF THE DRAWINGS

The above-mentioned and other features and advantages of the invention will become more apparent to one with skill in the art upon examination of the following figures and detailed description. The components in the figures are not necessarily to scale, emphasis instead being placed upon illustrating the principles of the invention. Moreover, in the figures, like reference numerals designate corresponding parts throughout the different views.

FIG. 2 is a block diagram of the electronic system of FIG. 1.

FIG. 3 is a schematic diagram of another embodiment of an electronic system of the present invention.

DETAILED DESCRIPTION OF THE PRESENTLY PREFERRED EMBODIMENTS

Figure 1:
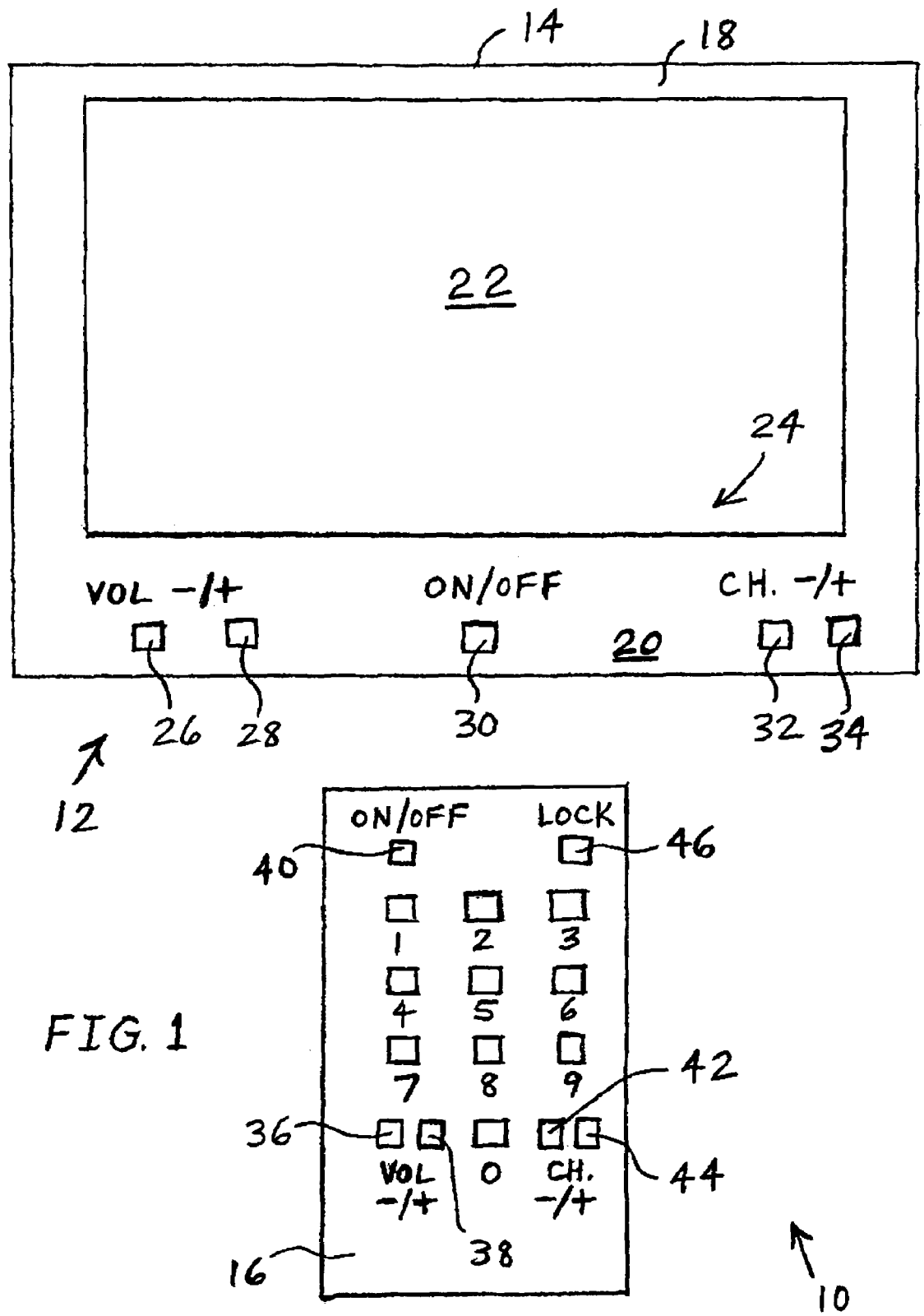
FIG. 1 is a schematic diagram of one embodiment of an electronic system of the present invention.

Referring to FIG. 1, there is shown one embodiment of an electronic system 10 of the present invention including an electronic apparatus 12 in the form of a television 14 and a remote controller 16 for controlling television 14. Television 14 may include a body 18 having a front surface 20 with a display screen 22 and a user interface 24. User interface 24 may include a plurality of pushbuttons, including pushbuttons 26, 28 for turning the audio volume of television 14 DOWN and UP, respectively; a pushbutton 30 for turning television 14 ON or OFF; and pushbuttons 32, 34 for changing the channel to the next lower numbered channel or the next higher numbered channel, respectively.

Remote controller 16 includes a plurality of pushbuttons including audio volume DOWN/UP pushbuttons 36, 38, ON/OFF pushbutton 40, and channel DOWN/UP pushbuttons 42, 44. Pushbuttons 36, 38, 40, 42, 44 may have functions that correspond to, or replicate, the functions of pushbuttons 26, 28, 30, 32, 34, respectively.

According to the present invention, remote controller 16 includes a lock pushbutton 46 that, when depressed by a user, disables pushbuttons 26, 28, 30, 32, 34 of user interface 24 such that pushbuttons 26, 28, 30, 32, 34 are no longer capable of performing their respective functions. The user may want to use pushbutton 46 to disable pushbuttons 26, 28, 30, 32, 34 in order to prevent a small child from changing the settings of television 12 by playing with pushbuttons 26, 28, 30, 32, 34. Disabling pushbuttons 26, 28, 30, 32, 34 may also prevent the settings of television 12 from being inadvertently changed as a result of being accidentally bumped into or jostled by a bystander.

Electronic system 10 will now be described in more detail with reference to FIG. 2. Television 14 may include a processor 48 that is electrically connected to user interface 24 via a communication line 50. Although shown in FIG. 2 as a single line for simplicity of illustration, communication line 50 may be in the form of multiple lines or a communication bus, for example.

User interface 24 may transmit an operational parameter control signal to processor 48 in response to manual manipulation of user interface 24. That is, in response to a user depressing one of pushbuttons 26, 28, 30, 32, 34, user interface 24 may transmit to processor 48 an operational parameter control signal that notifies or instructs processor 48 to control and/or adjust an operational parameter of television 14, such as the audio volume, ON/OFF state, or channel to which television 14 is tuned, for example. In other embodiments, an operational parameter of television 14 may include audio qualities, such as bass and treble, and/or video qualities, such as contrast, sharpness and tint.

Actuatable device 16, in response to being actuated by the user, may transmit a lockout signal that prevents processor 48 from adjusting the operational parameter of electronic system 10. In the specific embodiment shown in FIG. 1, the lockout signal may be transmitted by remote controller 16 in response to lock pushbutton 46 being depressed by the user. A switch 52 is shown in FIG. 2 in order to schematically depict the effect of the lockout signal from actuatable device 16 on television 14. That is, a lockout signal 54 from actuatable device 16 may have the effect of opening switch 52, as shown in FIG. 2, such that user interface 24 is decoupled from processor 48.

A subsequent or second actuation of lock pushbutton 46 may cause remote controller 16 to transmit an enable signal that has the effect of closing switch 52 such that user interface 24 is again coupled to processor 48. Thus, switch 52 may be toggled between an open state and a closed state by actuation of lock pushbutton 46.

Both the lockout signal and the enable signal from actuatable device 16 may be air-borne. For example, the signals may be in the form of infra-red signals or radio frequency signals, for example.

It is to be understood that a physical switch 52 is depicted in FIG. 2 only for purposes of clearly illustrating the effect of the lock signal and the enable signal on television 14. In actuality, the lock signal from actuatable device 16 may be received by user interface 24 and may prevent user interface 24 from creating and/or transmitting an operational parameter control signal. A subsequent enable signal from actuatable device 16 may be received by user interface 24 and may enable user interface 24 to again create and/or transmit an operational parameter control signal. In this case, there may be no physical switch 52 provided in line 50. Rather, user interface 24 and processor 48 may be permanently electrically connected together via line 50.

Similarly, the lock signal from actuatable device 16 may be received by processor 48 and may prevent processor 48 from responding to a received operational parameter control signal. A subsequent enable signal from actuatable device 16 may be received by processor 48 and may cause processor 48 to again adjust an operational parameter in response to receiving an operational parameter control signal from user interface 24. In this case too, there may be no physical switch 52 provided in line 50. Rather, user interface 24 and processor 48 may be permanently electrically connected together via line 50.

It is possible that actuatable device 16 may become inoperable or misplaced while user interface 24 is in the disabled state. In order to ensure that user interface 24 is not left permanently in the disabled state in this scenario, it may be possible to re-enable user interface 24 by depressing pushbuttons 26, 28, 30, 32, 34 in a predetermined sequence within a predetermined period of time. As one of an infinite number of possible examples, the predetermined sequence to enable user interface 24 may be to depress the pushbuttons in the order 28, 32, 30, 34, 26 within a five second period.

It may also be possible to disable user interface 24 by depressing pushbuttons 26, 28, 30, 32, 34 in another predetermined sequence. In one embodiment, the predetermined sequence that disables user interface 24 is identical to the predetermined sequence that enables user interface 24. However, in another embodiment, in order to avoid turning television 14 OFF while user interface 24 is enabled, the predetermined sequence that disables user interface 24 does not include ON/OFF pushbutton 30. As one of an infinite number of possible examples, the predetermined sequence to disable user interface 24 may be to depress the pushbuttons in the order 28, 32, 34, 26, 28, 32, 34, 26 within an eight second period.

In addition to, or as an alternative to, lock pushbutton 46 of remote controller 16, television 14 may include an actuatable device in the form of a switch 56 (FIG. 3) that is disposed on a back surface 58 of body 18 of television 14. Back surface 58 may be disposed opposite from front surface 20. Switch 56 may have a first position, shown in FIG. 3, in which user interface 24 is disabled, and a second position, achieved by actuating switch 56 in the direction indicated by arrow 60, in which user interface 24 may be enabled.

In an embodiment in which switch 56 supplements rather than replaces lock pushbutton 46 of remote controller 16, moving switch 56 to the lock position shown in FIG. 3 may disable user interface 24 regardless of what subsequent actions are taken with remote controller 16. However, when switch 56 is in the unlock position, then lock pushbutton 46 may be used to toggle user interface 24 between the enabled and disabled states. In this embodiment, in the event that remote controller 16 is lost or inoperable, the functionality may be provided to enable user interface 24 via depressing a predetermined sequence of pushbuttons on user interface 24 when switch 56 is in the unlock position.

Conversely, in another embodiment in which switch 56 supplements rather than replaces lock pushbutton 46, moving switch 56 to the unlock position may enable user interface 24 regardless of what subsequent actions are taken with remote controller 16. However, when switch 56 is in the lock position shown in FIG. 3, then lock pushbutton 46 may be used to toggle user interface 24 between the enabled and disabled states.

In one embodiment, television 14 may be user-configurable to allow the user to switch between the two embodiments described in the two paragraphs immediately above. For example, a user may switch between the two configurations by depressing a predetermined sequence of pushbuttons on user interface 24 and/or on remote controller 16, perhaps within a predetermined time period.

The electronic apparatus of the present invention is illustrated herein in the form of a television. However, it is to be understood that a television is just one example of an electronic apparatus that is suitable for application of the present invention. It is also within the scope of the invention for the electronic apparatus to be in the form of an audio system, a vehicle infotainment system, a computer, a medical device, or an industrial machine, for example.

The user interface of the present invention as illustrated herein includes only pushbuttons. However, it is also possible within the scope of the invention for the user interface to include dials, switches, touch pads, joy sticks, microphones and knobs, for example.

Although the present invention is described herein as being applied to the locking of a user interface on an electronic apparatus, it is to be understood that the principles of the invention may be equally applied to the locking of other user interfaces, such as that of the remote controller itself.

While the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. An electronic system comprising:
a body having a front surface and a back surface, the back surface being disposed opposite from the front surface;
a user interface disposed on the front surface of the body, the user interface being configured to transmit a control signal in response to manual manipulation of the user interface;
a processor coupled to the user interface and configured to adjust an operational parameter of the electronic system in response to receiving the control signal;
a switch disposed on the back surface of the body, the switch having a lock position and an unlock position; and
a remote controller including a user-actuatable pushbutton, the remote controller being configured to:
in response to a first actuation of the pushbutton, transmit a first air-borne signal to the processor to inhibit the processor from adjusting the operational parameter of the electronic system; and
in response to a second actuation of the pushbutton after the first actuation, transmit a second air-borne signal to the processor to enable the processor to adjust the operational parameter of the electronic system in response to receiving the operational parameter control signal;
the electronic system being user-configurable to enable a user to switch between:
a first configuration in which when the switch is in the lock position, the user interface remains disabled regardless of the pushbutton of the remote controller being depressed, and when the switch is in the unlock position, the user interface toggles between enabled and disabled states in response to the pushbutton of the remote controller being depressed; and
a second configuration in which when the switch is in the unlock position, the user interface remains enabled regardless of the pushbutton of the remote controller being depressed, and when the switch is in the lock position, the user interface toggles between enabled and disabled states in response to the pushbutton of the remote controller being depressed.

2. The system of claim 1, wherein the user interface includes a pushbutton, the manual manipulation of the user interface comprising depressing of the pushbutton.

3. The system of claim 1, wherein, when the processor is prevented from adjusting the operational parameter of the electronic system, actuation of the actuatable device enables the processor to adjust the operational parameter of the electronic system.

4. The system of claim 1, wherein the front surface of the body includes a display screen.

5. The system of claim 1, wherein the user interface includes a plurality of user interface pushbuttons, in the first configuration of the electronic system, the user interface being configured to be enabled, when in the disabled state and with the switch in the unlock position, by depressing the user interface pushbuttons in a predetermined sequence, the user interface pushbuttons each corresponding to a respective operational function other than enabling or disabling the user interface.

6. The system of claim 1, wherein the user interface includes a plurality of pushbuttons, the electronic system being user-configurable to enable the user to switch between the first configuration and the second configuration by depressing the user interface pushbuttons in a predetermined sequence.

7. The system of claim 1, wherein the electronic system is user-configurable to enable the user to switch between the first configuration and the second configuration by depressing the user interface pushbuttons in a predetermined sequence within a predetermined time period.

8. The system of claim 1, wherein the user interface includes a plurality of user interface pushbuttons, and the remote controller includes a plurality of remote controller pushbuttons, the electronic system being user-configurable to enable the user to switch between the first configuration and the second configuration by depressing the user interface pushbuttons and the remote controller pushbuttons in a predetermined sequence.

9. The system of claim 1, wherein the user interface includes a plurality of user interface pushbuttons, and the remote controller includes a plurality of remote controller pushbuttons, the electronic system being user-configurable to enable the user to switch between the first configuration and the second configuration by depressing the user interface pushbuttons and the remote controller pushbuttons in a predetermined sequence within a predetermined time period.

* * * * *

UNITED STATES PATENT AND TRADEMARK OFFICE
CERTIFICATE OF CORRECTION

| | | |
|---|---|---|
| PATENT NO. | : 8,299,901 B2 | Page 1 of 1 |
| APPLICATION NO. | : 12/012853 | |
| DATED | : October 30, 2012 | |
| INVENTOR(S) | : Robert F. Combs, Jr. | |

It is certified that error appears in the above-identified patent and that said Letters Patent is hereby corrected as shown below:

Title Page, Item (75) Inventor should read as follows:

Robert F. Combs, Jr., Macomb, MI (US)

Signed and Sealed this
Fifteenth Day of October, 2013

Teresa Stanek Rea
*Deputy Director of the United States Patent and Trademark Office*